Dec. 2, 1947.                W. SCHERR                2,432,044
                       POWER CONVERSION MECHANISM
                          Filed Nov. 8, 1943
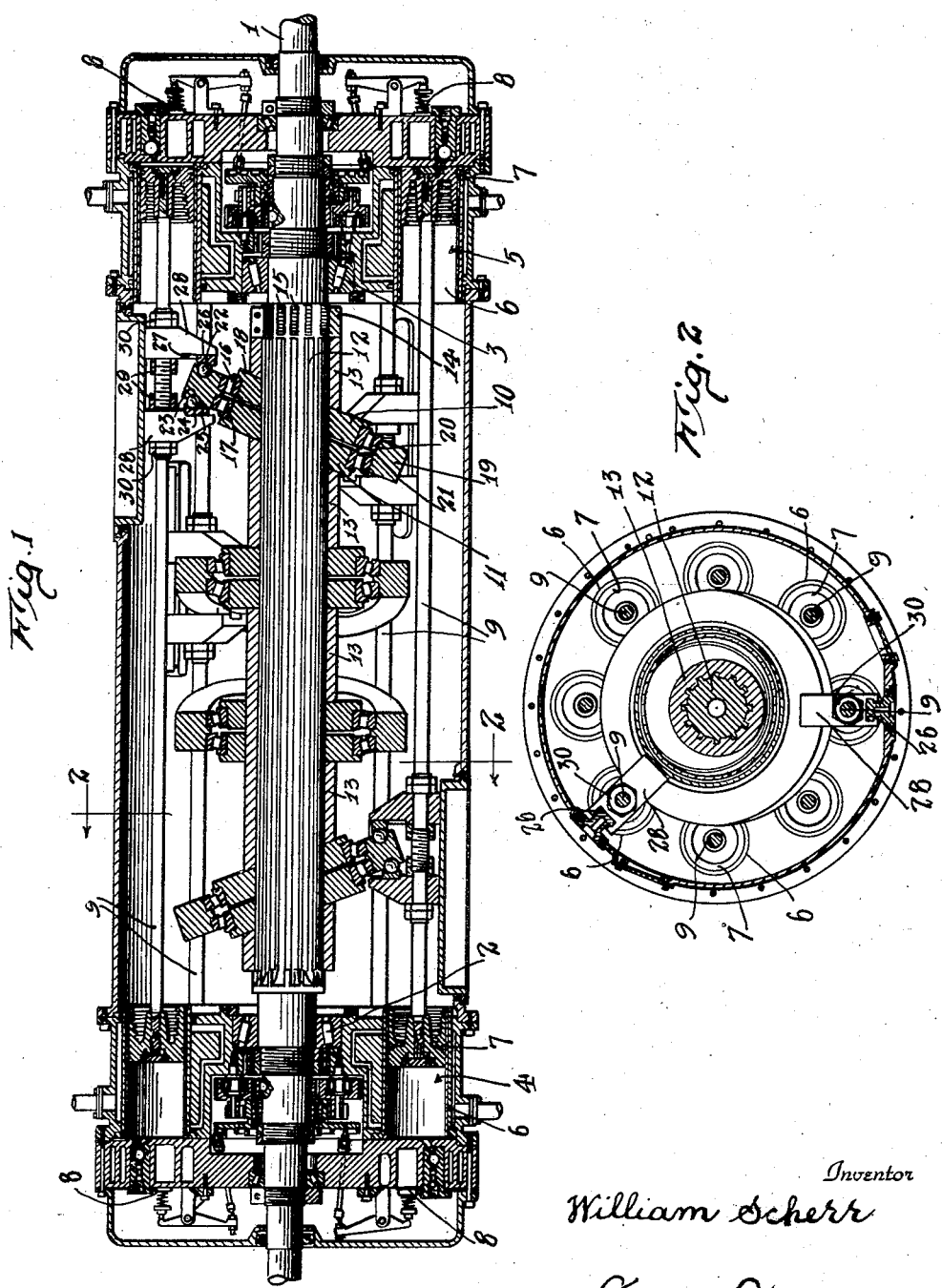
Inventor
William Scherr
By Lyon & Lyon
Attorneys Patented Dec. 2, 1947

2,432,044

UNITED STATES PATENT OFFICE 2,432,044

POWER CONVERSION MECHANISM

William Scherr, Los Angeles, Calif.

Application November 8, 1943, Serial No. 509,370

4 Claims. (Cl. 74—60)

This invention relates to driving mechanisms and more particularly to an improved form of driving construction for the translation of reciprocating motion into rotary motion, or vice versa.

It is an object of this invention to provide an improved form of driving mechanism adapted for the conversion of reciprocating motion into rotary motion, or vice versa.

Another object of this invention is to provide a driving mechanism adapted to be interposed between reciprocating and rotary power transmission elements to provide a driving connection therebetween.

Another object of this invention is to provide a driving mechanism which includes a driving plate adapted to be affixed to a rotary shaft, a ring member adapted to be operatively connected with a reciprocating member and bearing means which are interposed in the thus provided power transmission system, and means for compensating for bearing wear.

Another object is to provide a driving mechanism which includes a driving plate construction adapted to be secured to a rotating shaft, a ring, bearing means for coupling the ring with the reciprocating shaft, and a bearing means interposed between the ring and the drive plate providing for end thrust and means for compensating for wear occasioned by said thrust.

Other objects and advantages of this invention it is believed will be apparent from the following detailed description of a preferred embodiment thereof as illustrated in the accompanying drawings.

In the drawings:

Figure 1 is a side elevation principally in vertical mid-section of a motor or pump mechanism having incorporated therein a driving mechanism embodying my invention.

Figure 2 is a sectional end view taken substantially on the line 2—2 of Figure 1.

In the preferred embodiment of my invention as illustrated in the accompanying drawings, I have indicated the driving mechanism embodying my invention as incorporated within a multiple cylinder internal combustion engine, although it will be apparent that my invention is not limited to such adaptation.

In this illustration there is provided a drive shaft 1 which is rotatably supported on bearings 2 and 3 mounted in opposed cylinder blocks 4 and 5. The cylinder blocks 4 and 5 are of like construction and each provides a plurality of cylinders 6 within which pistons 7 are positioned. Any suitable form of valve mechanism is provided, as generally indicated at 8, controlling the admission and exhaust of fuel to the cylinders.

The pistons 7 are connected to piston rods 9 which in this modification are illustrated as connecting the pistons in the opposed blocks. The driving plate mechanism embodying my invention is illustrated as adapted to translate reciprocating motion of the piston rods 9 into a rotary drive for the drive shaft 1, and as illustrated, includes for each assembly a pair of plates 10 and 11 which are splined upon the shaft 1 by the multiple splines as indicated at 12.

The plates 10 and 11 are normally held spaced and are positioned upon the shaft 1 by means of sleeves 13 which are likewise splined to the shaft 1 by the splines 12 and are held in position of longitudinal adjustment by means of a lock collar 14 which is threaded to the shaft 1 with threads 15. Each of the plates 10 and 11 is provided with a thrust roller bearing 16, the race 17 of which is retained in position by means of an annular flange 18 formed on its respective supporting plate 10 or 11. The bearings 16 are as indicated inclined roller bearings acting to take both direct and lateral thrust. A driving plate ring 19 is journaled upon the pairs of bearings 16 and is held in position by means of opposed bearings 16, the outer races 20 of which engage the central annular flange 21 of the ring 19. The drive ring 19 is operatively connected with the piston rod 9 through the medium of a pair of ball bearing members 22 which are embedded in ball sockets 23 formed in the ring 19. The balls 22 fit likewise within ball sockets 24 formed in slide blocks 25. The slide blocks 25 are mounted to slide upon curved surfaces 26 and the curved retaining ribs 27 which fit within corresponding grooves formed in the blocks 25. The surfaces 26 and the ribs 27 are formed on and carried by arms 28. The arms 28 are journaled on the piston rods 9 and held in proper spaced relationship by means of lock collars 29 and lock nut assemblies 30.

By provision of the lock collars 29 and lock nut assembly 30, the position of the arms 28 on the piston rods 9 may be adjusted to compensate for any wear occurring in the balls 22 or in the ball-retaining sockets 23 and 24 of the ring 19 and slide blocks 25, respectively. The assembly thus provided compensates for all movement of the ring 19 as it actuates the drive plates 10 and 11 in transmitting the force of reciprocation of the piston rods 9 to the drive plates 10 and 11 which, because of their inclination upon the shaft 1, translates this reciprocating force into rotary motion of the shaft 1.

In order to compensate for any wear that may occur in the opposed inclined roller bearings 16 carried by the driving plates 10 and 11, positioning sleeves 13 and adjusting nut 14 are provided. Thus when any wear occurs in this bearing assembly or in the races or roller members thereof, it is only necessary to take up upon the lock collar 14 by threading the same further upon the shaft 1 at the threads 15 and this take-up extends through the series of adjustment sleeves 13 through the entire series of driving plate assemblies, one of which, as the drawing shows, is provided for every two piston rods. The plate assembly and number of rods connected to driving plate mechanism may vary to suit conditions.

While I have herein illustrated the complete assembly of the internal combustion engine including the valve actuating means, etc., it is to be understood that this illustration is merely for the purpose of indicating complete assembly and my invention is not limited to adaptation in an internal combustion engine or an internal combustion engine of the type illustrated but is equally adaptable for use in connection with compressors, pumps or any other like mechanism wherein it is desired to translate reciprocating rotary motion or to reverse the direction of transmission of power.

Having fully described my invention it is to be understood that it is of the full scope of the appended claims.

I claim:

1. A driving mechanism including a pair of spaced driving plates slidably secured to a shaft, a ring, a pair of thrust bearings by which the ring is journaled upon the said drive plates, ball members carried by sockets formed in the opposed faces of the ring, a slide for each ball member, means for guidingly supporting said slides, the latter said means including opposed arms, a piston rod, and means for adjustably securing said arms to the piston rod.

2. A drive mechanism adapted to transmit motion between a rotating shaft and a plurality of reciprocating piston rods which includes a plurality of drive plates slidably mounted upon the shaft, a pair of arms secured to each piston rod and adapted to cooperate with one of said drive plates, each of the drive plates including two plate members, and the drive plates being splined to the shaft, adjustment sleeves mounted upon the shaft between the drive plate assemblies, an adjustment collar for locking the position of the sleeves along the shafts, and means for interconnecting each pair of drive plates with each pair of piston arms, which means includes for each such connection a ring member, a pair of rotary and thrust bearings interposed between the ring member and each said pair of plates, bearing members carried by each of the rings and adapted to cooperate with slide blocks slidably supported by said arms.

3. A drive mechanism for transmitting power between a piston and a shaft comprising a pair of spaced driving plates mounted on the shaft in angled relation relative to the axis of the shaft, a ring, bearing members interposed between the ring and the plates, armed members secured to the piston rod, slide blocks carried by the arms and adapted to slide longitudinally thereof, and bearing members interposed between the slide blocks and the ring.

4. A drive mechanism for transmitting power between a piston and a shaft comprising a pair of spaced driving plates mounted on the shaft in angled relation relative to the axis of the shaft, a ring, bearing members interposed between the ring and the plates, armed members secured to the piston rod, slide blocks carried by the arms and adapted to slide longitudinally thereof, bearing members interposed between the slide blocks and the ring, and means on the piston rods whereby the distance between said arms may be adjusted.

WILLIAM SCHERR.

REFERENCES CITED

The following references are of record in the file of this patent:

UNITED STATES PATENTS

| Number | Name | Date |
|---|---|---|
| 1,152,004 | Canton | Aug. 31, 1915 |
| 1,346,672 | Patton | July 13, 1920 |
| 1,716,020 | Winckler | June 4, 1929 |
| 1,781,008 | Greening et al. | Nov. 11, 1930 |
| 1,826,325 | Paul | Oct. 6, 1931 |
| 1,978,762 | Reagan | Oct. 30, 1934 |
| 2,112,934 | Stinnes et al. | Apr. 5, 1938 |